US008744644B2

(12) United States Patent
Sung et al.

(10) Patent No.: US 8,744,644 B2
(45) Date of Patent: Jun. 3, 2014

(54) APPARATUS AND METHOD FOR DETECTING LOCATION OF VEHICLE

(75) Inventors: Kyung-Bok Sung, Daejeon (KR); Kyoung-Hwan An, Daejeon (KR); Kyoung-Wook Min, Daejeon (KR); Jeong-Dan Choi, Daejeon (KR); Dong-Yong Kwak, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 156 days.

(21) Appl. No.: 13/354,067

(22) Filed: Jan. 19, 2012

(65) Prior Publication Data

US 2012/0185112 A1 Jul. 19, 2012

(30) Foreign Application Priority Data

Jan. 19, 2011 (KR) ........................ 10-2011-0005260
Jun. 22, 2011 (KR) ........................ 10-2011-0060623

(51) Int. Cl.
*G06F 21/00* (2013.01)

(52) U.S. Cl.
USPC ................................................ 701/1; 701/532

(58) Field of Classification Search
USPC .................. 701/1, 25, 23, 527, 533; 180/116, 180/167–169; 318/580, 587; 340/988
See application file for complete search history.

(56) References Cited

U.S. PATENT DOCUMENTS 8,090,491 B2 * 1/2012 Barfoot et al. .................. 701/25
2008/0040029 A1 * 2/2008 Breed ........................... 701/208
2009/0149201 A1 6/2009 Ryu et al.
2011/0015817 A1 * 1/2011 Reeve ............................. 701/25
2011/0054791 A1 * 3/2011 Surampudi et al. ........... 701/216
2012/0035798 A1 * 2/2012 Barfoot et al. .................. 701/25

FOREIGN PATENT DOCUMENTS

| | | |
|---|---|---|
| KR | 2003-0041132 | 5/2003 |
| KR | 1020060055920 | 5/2006 |
| KR | 1020060102016 | 9/2006 |
| KR | 1020090001176 | 1/2009 |
| KR | 1020090058879 | 6/2009 |
| KR | 1020090062215 | 6/2009 |
| KR | 1020100036868 | 4/2010 |
| WO | 02/10794 A2 | 2/2002 |

* cited by examiner

*Primary Examiner* — Marthe Marc-Coleman

(74) *Attorney, Agent, or Firm* — Nelson Mullins Riley & Scarborough LLP; Anthony A. Laurentano, Esq.; Lewis Lee, Esq.

(57) ABSTRACT

An apparatus and method for detecting the location of a vehicle using results sensed by sensing devices installed outside the vehicle and the internal information of the vehicle without obtaining the current location information of the vehicle using signals transmitted from a Global Positioning System (GPS) satellite, the apparatus for detecting the location of a vehicle includes a location information reception unit for receiving location information that is generated by sensing a vehicle passing by a sensing point and that corresponds to the sensing point. A location detection unit estimates a current location of the vehicle based on information sensed by internal sensors of the vehicle and control information for a vehicle manipulation part while the location information is not received, and corrects the estimated current location of the vehicle using received location information when the location information is received.

9 Claims, 5 Drawing Sheets

APPARATUS AND METHOD FOR DETECTING LOCATION OF VEHICLE

CROSS REFERENCE TO RELATED APPLICATIONS

This application claims the benefit of Korean Patent Application Nos. 10-2011-0005260 filed on Jan. 19, 2011 and 10-2011-0060623 filed on Jun. 22, 2011, which are hereby incorporated by reference in their entirety into this application.

BACKGROUND OF THE INVENTION

1. Technical Field

The present invention relates generally to an apparatus and method for detecting the location of a vehicle. More particularly, the present invention relates to an apparatus and method for detecting the location of a vehicle using results sensed by sensing devices installed outside the vehicle and the internal information of the vehicle without obtaining the current location information of the vehicle using signals transmitted from a Global Positioning System (GPS) satellite.

2. Description of the Related Art

Currently, a Global Positioning System (hereinafter referred to as a "GPS") has been utilized in various fields. In particular, a GPS has been actively used as a navigation device for guiding a user within a vehicle to his or her destination, and has been mounted even on a camera or a mobile phone to play an important role essential to the provision of various types of services.

For example, in the fields of a vehicle that is being driven autonomously in an unmanned manner, information about the current location of the vehicle is information essential to unmanned driving. Therefore, a high-performance GPS is used in fields related to a vehicle that is being driven autonomously in an unmanned manner, and, additionally, the precise current location of the vehicle is obtained using additional sensors such as an acceleration sensor and a compass sensor.

However, a problem arises in that it is difficult to popularize a high-performance GPS due to the high price thereof, and it is difficult to use a low-performance GPS in unmanned autonomous driving due to the errors thereof.

Further, in order to commercialize vehicles that are being autonomously driven in an unmanned manner, the precision of the current location information of each vehicle that is most essential to unmanned autonomous driving must be maintained at a high degree of precision while the prices of the sensors mounted on the vehicle are minimized.

SUMMARY OF THE INVENTION

Accordingly, the present invention has been made keeping in mind the above problems occurring in the prior art, and an object of the present invention is to provide an apparatus and method that can detect the location of a vehicle using the results sensed by sensing devices located outside the vehicle and the internal information of the vehicle without obtaining the current location information of the vehicle using signals transmitted from a GPS satellite, in a situation in which the intensity of signals output from a GPS system is too weak to be used due to a multistory building, the natural environment, or the like, or in which errors in the signals output from the GPS system may increase.

In accordance with an aspect of the present invention to accomplish the above object, there is provided an apparatus for detecting a location of a vehicle, including a location information reception unit for receiving location information that is generated by sensing a vehicle passing by a sensing point and that corresponds to the sensing point; and a location detection unit for estimating a current location of the vehicle based on information sensed by internal sensors of the vehicle and control information for a vehicle manipulation part while the location information is not received, and correcting the estimated current location of the vehicle using received location information when the location information is received.

Preferably, the location detection unit may include a communication unit for performing wireless communication with an external sensing device that transmits the location information; a sensor information collection unit for collecting pieces of information sensed by at least one of an ultrasonic sensor, a yaw rate sensor for vehicle dynamics control, a wheel speed sensor, and a velocity sensor which are mounted in the vehicle; a control information collection unit for collecting pieces of control information for at least one of a steering wheel, a brake, and an accelerator of the vehicle; and a location calculation unit for performing deduced driving based on the pieces of information collected by both the sensor information collection unit and the control information collection unit, thus estimating the location of the vehicle.

Preferably, the location calculation unit corrects results obtained by performing the deduced driving in real time, based on the location information received in real time from the external sensing device.

Preferably, the location information may be received from an external sensing device located at regular sections of a road on which the vehicle is driven.

Preferably, the external sensing device may include a communication unit for performing wireless communication with the location information reception unit; a sensor unit for sensing a vehicle passing by a sensing area corresponding to a specific radius from a point at which the external sensing device is located; and a vehicle awareness unit for generating location information of the vehicle based on results sensed by the sensor unit.

In accordance with another aspect of the present invention to accomplish the above object, there is provided a method of detecting a location of a vehicle, the method being configured to detect the vehicle location by a location detection apparatus mounted in the vehicle while operating in conjunction with an external sensing device located at regular sections of a road; the location detection apparatus requesting location information from the external sensing device; receiving a location information response, which includes results of sensing of the vehicle corresponding to the location information request, from the external sensing device; estimating a current location of the vehicle based on information sensed by internal sensors of the vehicle and control information for the vehicle; and correcting the estimated current location of the vehicle based on the results of sensing of the vehicle.

Preferably, the correcting the current location may be configured such that the vehicle is driven a certain distance using the detected location of the vehicle and the location of the vehicle is corrected in real time based on a location information response received again from the external sensor device, thus detecting the location of the vehicle.

Preferably, the requesting the location information may be configured to request location information corresponding to an identification (ID) of the vehicle.

Preferably, the estimating the current location may be performed based on both the sensed information that has been sensed by at least one of an ultrasonic sensor, a yaw rate sensor for vehicle dynamics control, a wheel speed sensor, and a velocity sensor which are mounted in the vehicle, and the control information for at least one of a steering wheel, a brake, and an accelerator of the vehicle.

BRIEF DESCRIPTION OF THE DRAWINGS

The above and other objects, features and advantages of the present invention will be more clearly understood from the following detailed description taken in conjunction with the accompanying drawings, in which.

DESCRIPTION OF THE PREFERRED EMBODIMENTS

Figure 1:
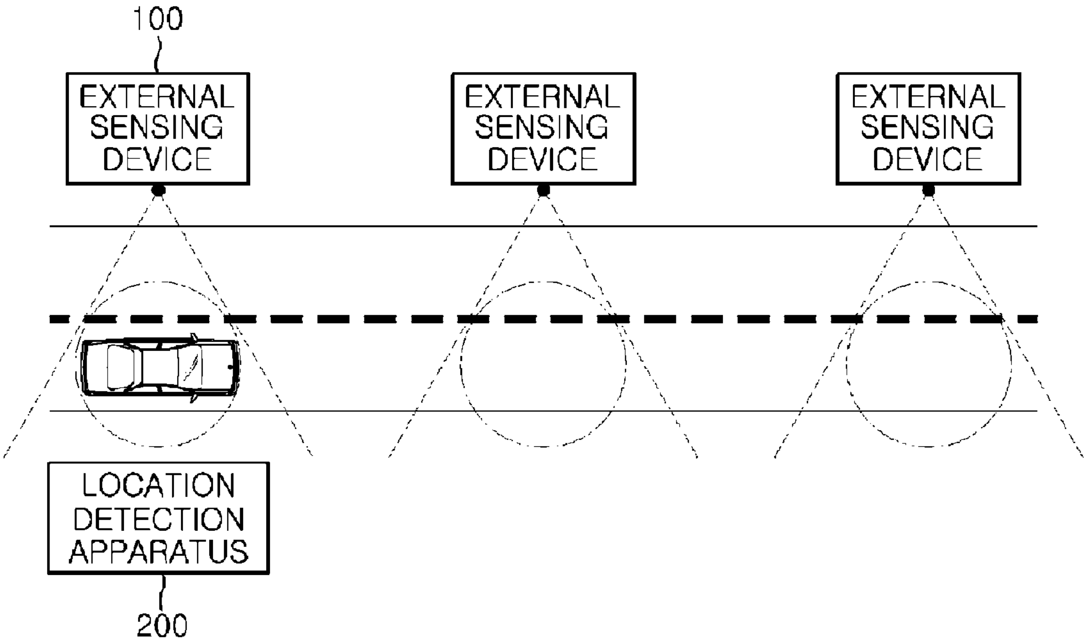
FIG. 1 is a diagram schematically showing an environment to which an apparatus for detecting the location of a vehicle according to an embodiment of the present invention is applied.

The present invention will be described in detail below with reference to the accompanying drawings. In the following description, redundant descriptions and detailed descriptions of known functions and elements that may unnecessarily make the gist of the present invention obscure will be omitted. Embodiments of the present invention are provided to fully describe the present invention to those having ordinary knowledge in the art to which the present invention pertains. Accordingly, in the drawings, the shapes and sizes of elements may be exaggerated for the sake of a clearer description.

Hereinafter, an apparatus and method for detecting the location of a vehicle according to embodiments of the present invention will be described in detail with reference to the attached drawings.

Figure 2:
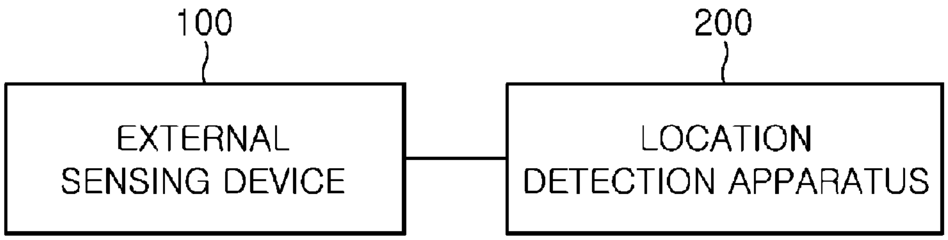
FIG. 2 is a block diagram showing the construction of the vehicle location detection apparatus according to an embodiment of the present invention.

FIG. 1 is a diagram showing an environment to which an apparatus for detecting the location of a vehicle according to an embodiment of the present invention is applied, and FIG. 2 is a block diagram showing the construction of the apparatus for detecting the location of a vehicle according to an embodiment of the present invention.

Referring to FIG. 1, an apparatus 200 for detecting the location of a vehicle (hereinafter referred to as a "location detection apparatus") according to an embodiment of the present invention is applied to a road on which vehicles are being driven. Generally, the road is a path on which vehicles are being driven, and includes a road on which it is difficult to receive GPS signals due to a multistory building or the natural environment, a road which is located in a basement or a tunnel in which GPS signals cannot be received, etc.

The location detection apparatus 200 is operated in conjunction with at least one external sensing device 100.

At least one external sensing device 100 is located at regular sections or at every important section, and transfers the location information of a vehicle passing by a relevant sensing point to the location detection apparatus 200 using wireless communication.

Further, the at least one external sensing device 100 is installed at regular sections or at every important section, and may be additionally installed at points where a variation in location may greatly occur, for example, an intersection or a curved road.

The location detection apparatus 200 performs deduced driving based on information sensed by the internal sensors (not shown) of the vehicle and control information for a vehicle manipulation part (not shown), corrects the results of the deduced driving of the vehicle based on the location information of the vehicle that has been received from the external sensing device 100, and then detects the current location of the vehicle. Here, the control information may include, for example, a steering wheel angle, a brake position, an accelerator position, etc., but is not limited to these examples.

Such a vehicle location detection apparatus 200 calculates the current location of the vehicle using only the information sensed by the internal sensors of the vehicle and the control information without using a separate device for detecting the absolute location of the vehicle. Further, the vehicle location detection apparatus 200 receives information required to correct the current location of the vehicle at regular sections from the external sensing device, thus correcting the current location of the vehicle.

The vehicle location detection apparatus 200 according to the embodiment of the present invention is described as being operated in conjunction with the external sensing device 100, but is not limited to this embodiment.

Next, the external sensing device 100 and the location detection apparatus 200 will be described in detail below with reference to FIG. 3.

Figure 3:
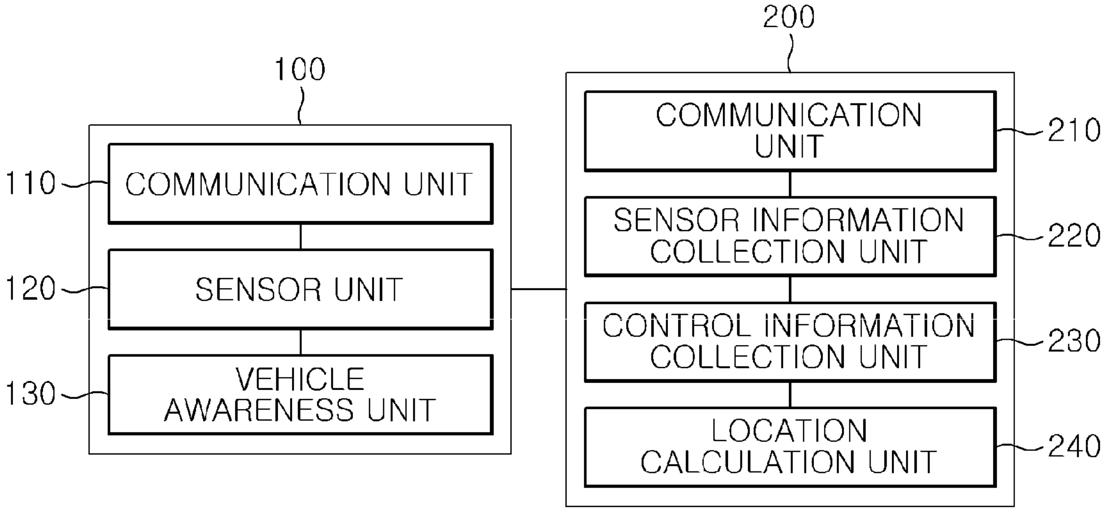
FIG. 3 is a block diagram showing the construction of an external sensing device and the location detection apparatus according to an embodiment of the present invention.

FIG. 3 is a block diagram showing the construction of the external sensing device 100 and the location detection apparatus 200 according to an embodiment of the present invention.

Referring to FIG. 3, the external sensing device 100 includes a communication unit 110, a sensor unit 120, and a vehicle awareness unit 130.

The communication unit 110 performs wireless communication with the location detection apparatus 200. In this case, the communication unit 110 performs wireless communication over a Wireless Local Area network (WLAN), a hi-pass network, a Code Division Multiple Access (CDMA) network, or the like.

The sensor unit 120 senses an object passing by a sensing area corresponding to a specific radius from each point at which the external sensing device 100 is located, and transmits the results of sensing (hereinafter referred to as "sensed results") to the vehicle awareness unit 130.

The vehicle awareness unit 130 determines whether the sensed results received from the sensor unit 120 correspond to a vehicle. If it is determined that the sensed results correspond to a vehicle, the vehicle awareness unit 130 determines whether the vehicle is a valid vehicle which requested location information.

The vehicle awareness unit 130 calculates the location of the vehicle only at a point having the highest precision of sensing among all sensing points and then generates location information, without calculating the location of the vehicle at all sensing points on the basis of the sensed results. Further, the vehicle awareness unit 130 transmits the generated location information to the location detection apparatus 200 within the relevant vehicle. In this case, the vehicle awareness unit 130 determines whether the vehicle is the valid vehicle which requested the location information, by using the Identification (ID) of the vehicle that has requested the location information, and then transmits the generated location information to the vehicle.

The external sensing device 100 transmits the location information of the vehicle obtained on the basis of the results sensed in the sensing area, covered by the external sensing device 100, of the entire road on which the vehicle is located, to the location detection apparatus 200 within the vehicle.

When the external sensing device 100 generates location information by sensing vehicles over the entire road on which the vehicle is located, vehicles must be sensed over the entire road, and thus the required computational load increases compared to the case where the vehicle is sensed only in a relevant sensing area. Therefore, the external sensing device 100 according to the embodiment of the present invention is characterized in that the vehicle is sensed when passing by a relevant sensing area on the entire road, and the location information corresponding to the sensed results is transmitted to the relevant vehicle.

The location detection apparatus 200 includes a communication unit 210, a sensor information collection unit 220, a control information collection unit 230, and a location calculation unit 240.

The communication unit 210 performs wireless communication with the external sensing device 100. In this case, the communication unit 110 performs wireless communication over a WLAN, a hi-pass network, a CDMA network, or the like.

The communication unit 210 according to an embodiment of present invention functions as a location information reception unit (not shown) for receiving the sensed results output from the external sensing device 100, that is, the location information of the vehicle.

The sensor information collection unit 220 collects pieces of information sensed by internal sensors mounted in the vehicle. Here, the sensors mounted in the vehicle correspond to an ultrasonic sensor, a yaw rate sensor for vehicle dynamics control, a wheel speed sensor, a velocity sensor, etc.

The control information collection unit 230 collects pieces of control information for a vehicle manipulation part required to control the vehicle, for example, for a steering wheel, a brake, and an accelerator. That is, the control information may include, for example, a steering wheel angle, a brake position, an accelerator position, etc.

The location calculation unit 240 performs deduced driving based on the pieces of information collected by the sensor information collection unit 220 and the control information collection unit 230, that is, the sensed information and the control information, and then calculates the location of the vehicle. Here, the deduced driving corresponds to dead reckoning, and is a method of obtaining the location and the direction of a vehicle only using a gyroscope, an encoder (or an odometer), and a speedometer without using the information of external sensors such as astronomical equipment or ground equipment. Next, the location calculation unit 240 corrects the calculated location of the vehicle using the location information of the vehicle received from the at least one external sensing device 100, thus calculating the current location of the vehicle.

Such a location detection apparatus 200 requests the location information from the at least one external sensing device 100 while transmitting the ID of the vehicle to the external sensing device 100, and then corrects the current location of the vehicle on the basis of a response to the request, that is, the location information of the vehicle. In this case, the ID of the vehicle may correspond to a unique ID which each vehicle has, for example, a vehicle registration number, a terminal number, or the current location information of the vehicle, but is not limited to these examples.

Since the vehicle location detection apparatus 200 according to an embodiment of the present invention provides location information based on dead reckoning technology, it can correct the current location of the vehicle only when receiving the location information of the vehicle from the at least one external sensing device 100 before calculating the location information. This may be an advantage of enabling restrictions such that location information can be provided only within a specific area in the fields of the art in which the location of a vehicle is detected.

Next, a method of detecting the location of a vehicle will be described in detail with reference to FIGS. 4 to 6.

Figure 4:
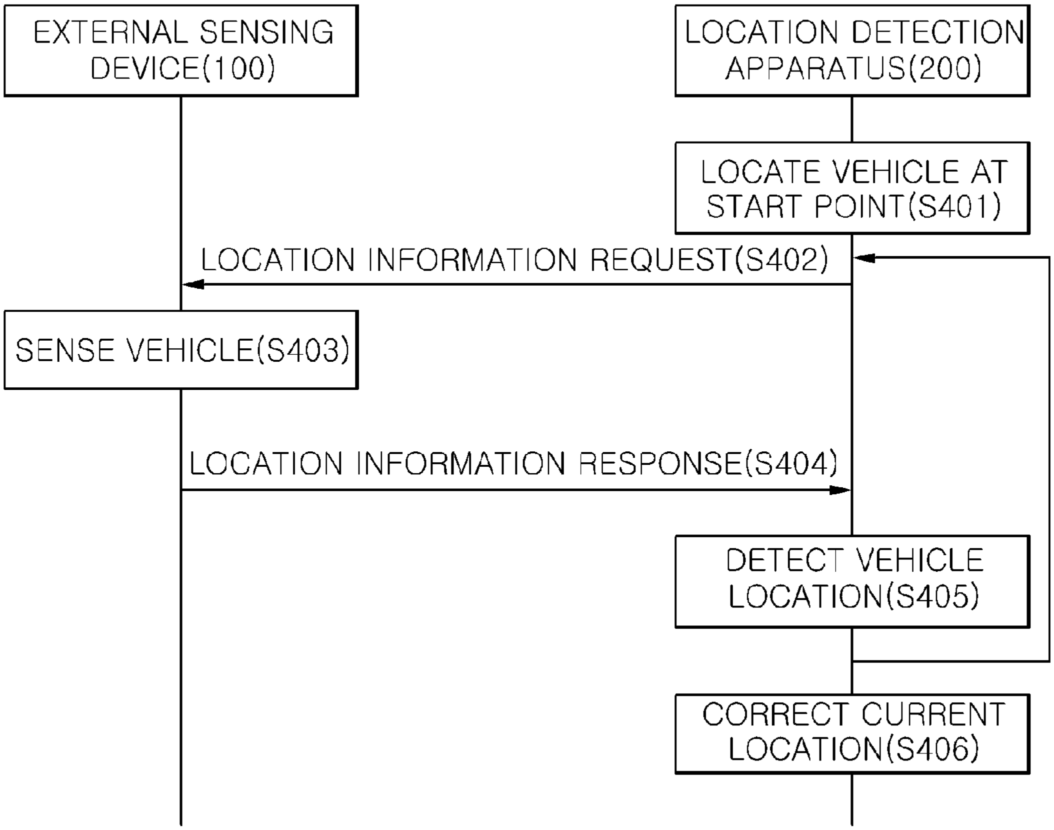
FIG. 4 is a flowchart showing a method of detecting the location of a vehicle according to an embodiment of the present invention.

FIG. 4 is a flowchart showing a method of detecting the location of a vehicle according to an embodiment of the present invention. Further, FIGS. 5 and 6 are diagrams illustrating the application of the vehicle location detection method according to an embodiment of the present invention.

First, the vehicle location detection apparatus 200 according to the embodiment of the present invention is an apparatus that can be applied to a road on which vehicles are driven according to the embodiment of the present invention, and is operated in conjunction with at least one external sensing device 100 located at regular sections or at every important section of the road.

Referring to FIG. 4, the vehicle including the location detection apparatus 200 is located at a relevant point of the road on which the location of the vehicle can be detected, that is, a start point, at step S401. Next, the vehicle starts driving at the start point.

The location detection apparatus 200 requests location information from the external sensing device 100 located on the road on which the vehicle is driven at step S402. Here, the location detection apparatus 200 requests location information from the external sensing device 100 using the ID of the vehicle, such as a vehicle registration number, a terminal number, or the current location of the vehicle.

The external sensing device 100 senses the vehicle passing by the relevant sensing point at step S403. Here, the external sensing device 100 is described in the sequence in which the location information request is received and then the vehicle is sensed, but the external sensing device 100 can sense the vehicle in real time regardless of the location information request.

The external sensing device 100 makes a location information response including the current location of the vehicle corresponding to the location information request at step S404. Here, the location information response includes results in which the ID of the vehicle matches the current location of the vehicle.

Figure 5:
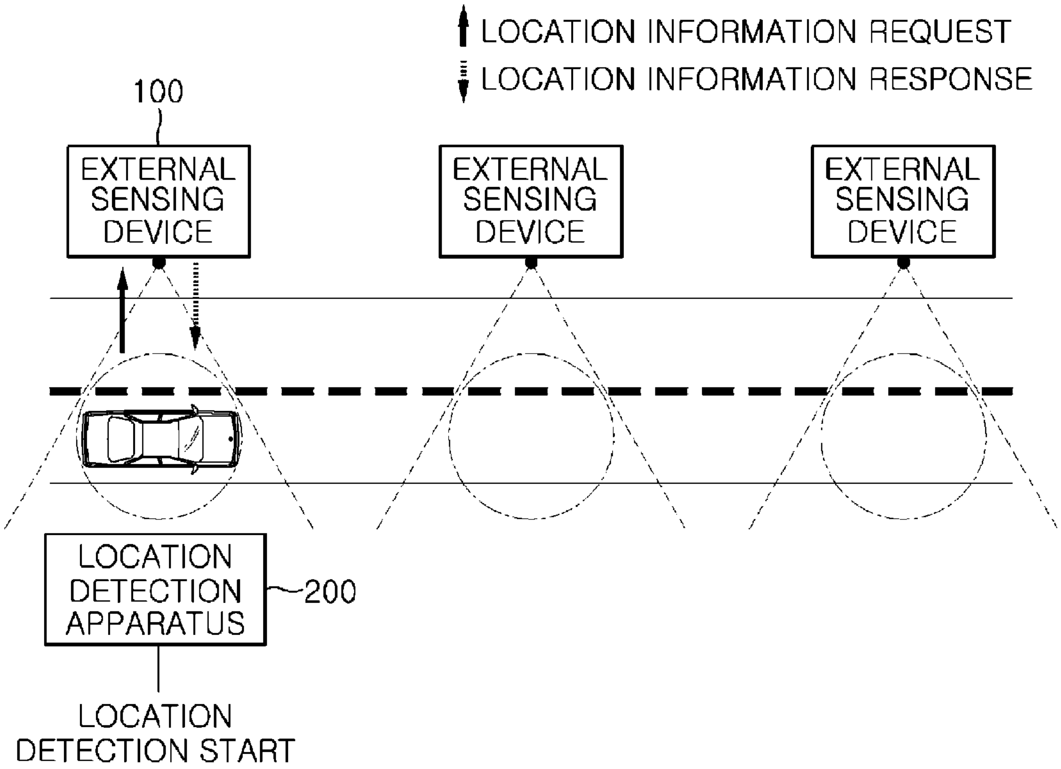
FIGS. 5 and 6 are diagrams illustrating the application of the vehicle location detection method according to an embodiment of the present invention.

As shown in FIG. 5, the location detection apparatus 200 requests location information from the external sensing device 100, and the external sensing device 100 sends a location information response to the location detection apparatus 200.

The location detection apparatus 200 detects the location of the vehicle on the basis of the location information received from the external sensing device 100, the sensed information output from the internal sensors mounted in the vehicle, and the control information for a component manipulated to control the vehicle at step S405. In this case, the location detection apparatus 200 can estimate the location of the vehicle by performing deduced driving on the basis of the location information, the sensed information, and the control information, but it is not limited to this construction.

Figure 6:
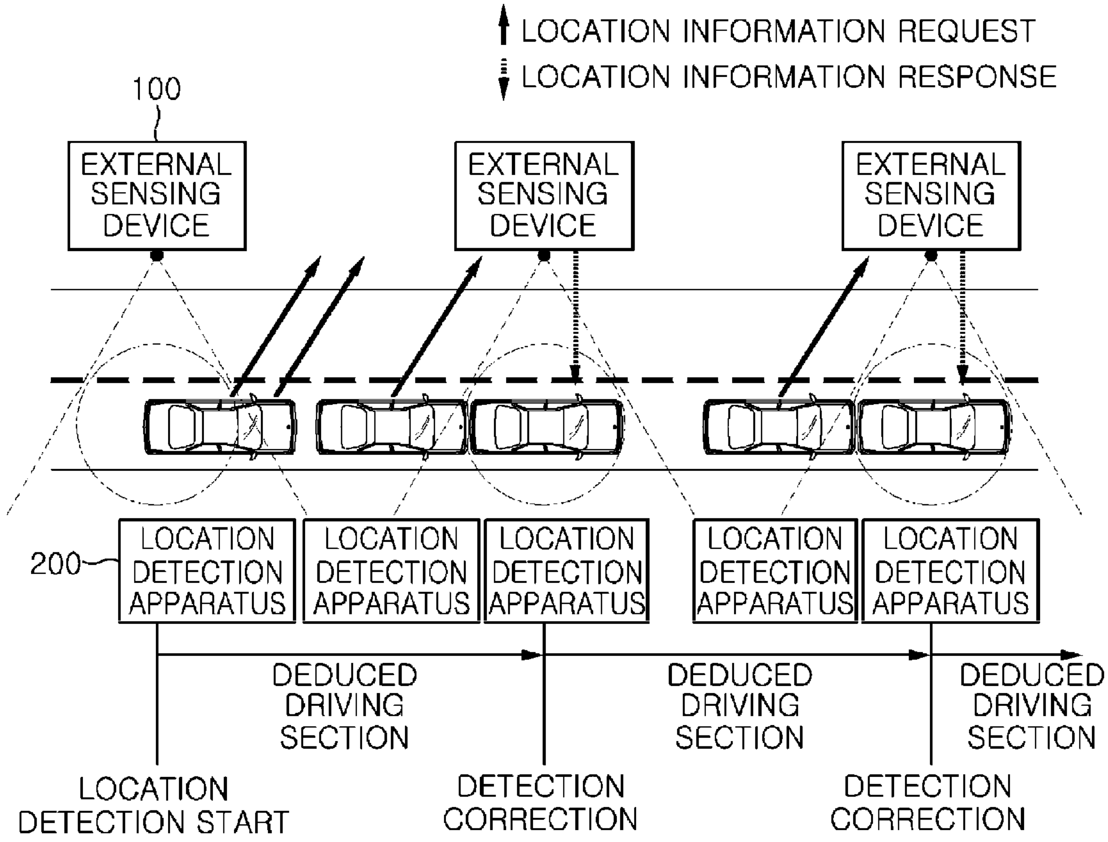

As shown in FIG. 6, the location detection apparatus 200 performs deduced driving while continuously requesting location information from the external sensing device 100 using the ID of the vehicle during the driving of the vehicle. In this case, the external sensing device 100 may receive the location information request or may not according to the distance to the location detection apparatus 200.

However, when the vehicle including the location detection apparatus 200 becomes closer to the external sensing device 100, the location detection apparatus 200 can receive a response to the location information request.

In this regard, the location detection apparatus 200 corrects the current location value of the vehicle obtained from the deduced driving by using the current location corresponding to the received location information response, thus detecting the precise location of the vehicle at step S406.

In this way, the location detection apparatus 200 enables the vehicle to be driven a predetermined distance again using the detected location of the vehicle, and is then capable of correcting the location of the vehicle in real time on the basis of a location information response received from a subsequent external sensing device 100.

As described above, the vehicle location detection apparatus according to embodiments of the present invention can provide the precise location information of the vehicle without using a GPS.

According to embodiments of the present invention, the apparatus and method for detecting the location of a vehicle can provide the location information of a vehicle without using a GPS. Further, the vehicle location detection apparatus enables external sensing devices to be installed in a building parking lot or in a basement, thus providing the location information of the vehicle using the external sensing devices even at a point where the intensity of GPS signals decreases and then the performance of the GPS is deteriorated.

Furthermore, according to embodiments of the present invention, the vehicle location detection apparatus and method can provide location information within a predetermined space and can provide differentiated services for relevant areas.

As described above, the preferred embodiments of the present invention have been disclosed in the drawings and the present specification. In this case, although specific terms have been used, they are merely intended to describe the present invention and are not intended to limit the meanings of the terms or the scope of the present invention disclosed in the accompanying claims. Accordingly, those skilled in the art will appreciate that various modifications and other equivalent embodiments are possible from the above descriptions. Therefore, the scope of the present invention should be defined by the technical spirit of the invention as disclosed in the accompanying claims.

What is claimed is:

1. An apparatus for detecting a location of a vehicle, comprising:

a location information reception unit for receiving location information that is generated by one or more external sensors from sensing a vehicle passing by a sensing point and that corresponds to the sensing point; and a location detection unit for estimating a current location of the vehicle based on information sensed by internal sensors of the vehicle and control information for a vehicle manipulation part while the location information is not received, and correcting the estimated current location of the vehicle using received location information when the location information is received.

2. The apparatus of claim 1, wherein the location detection unit comprises:

a communication unit for performing wireless communication with an external sensing device that transmits the location information;

a sensor information collection unit for collecting pieces of information sensed by at least one of an ultrasonic sensor, a yaw rate sensor for vehicle dynamics control, a wheel speed sensor, and a velocity sensor which are mounted in the vehicle;

a control information collection unit for collecting pieces of control information for at least one of a steering wheel, a brake, and an accelerator of the vehicle; and a location calculation unit for performing deduced driving based on the pieces of information collected by both the sensor information collection unit and the control information collection unit, thus estimating the location of the vehicle.

3. The apparatus of claim 2, wherein the location calculation unit corrects results obtained by performing the deduced driving in real time, based on the location information received in real time from the external sensing device.

4. The apparatus of claim 1, wherein the location information is received from an external sensing device located at regular sections of a road on which the vehicle is driven.

5. The apparatus of claim 4, wherein the external sensing device comprises:

a communication unit for performing wireless communication with the location information reception unit;

a sensor unit for sensing a vehicle passing by a sensing area corresponding to a specific radius from a point at which the external sensing device is located; and a vehicle awareness unit for generating location information of the vehicle based on results sensed by the sensor unit.

6. A method of detecting a location of a vehicle, the method being configured to detect the vehicle location by a location detection apparatus mounted in the vehicle while operating in conjunction with an external sensing device located at regular sections of a road;

the location detection apparatus requesting location information from the external sensing device;

receiving a location information response, which includes results of sensing of the vehicle corresponding to the location information request, from the external sensing device;

estimating a current location of the vehicle based on information sensed by internal sensors of the vehicle and control information for the vehicle; and correcting the estimated current location of the vehicle based on the results of sensing of the vehicle.

7. The method of claim 6, wherein the correcting the current location is configured such that the vehicle is driven a certain distance using the detected location of the vehicle and the location of the vehicle is corrected in real time based on a location information response received again from the external sensor device, thus detecting the location of the vehicle.

8. The method of claim 6, wherein the requesting the location information is configured to request location information corresponding to an identification (ID) of the vehicle.

9. The method of claim 6, wherein the estimating the current location is performed based on both the sensed information that has been sensed by at least one of an ultrasonic sensor, a yaw rate sensor for vehicle dynamics control, a wheel speed sensor, and a velocity sensor which are mounted in the vehicle, and the control information for at least one of a steering wheel, a brake, and an accelerator of the vehicle.

* * * * *